Patented Dec. 1, 1931

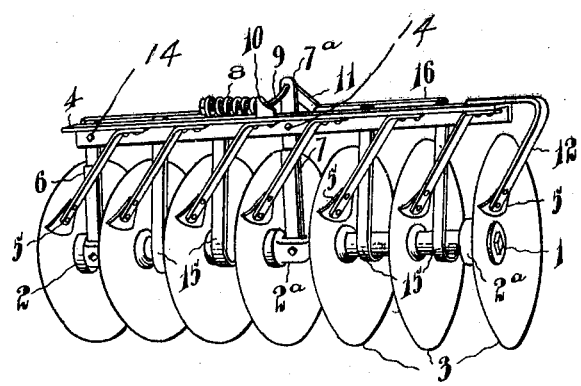

1,834,485

UNITED STATES PATENT OFFICE

LLOYD EDWARD BISSELL, OF ELORA, ONTARIO, CANADA, ASSIGNOR TO T. E. BISSELL COMPANY, OF ELORA, CANADA, A CORPORATION OF CANADA

DISK HARROW

Application filed September 17, 1930. Serial No. 482,601.

This invention relates to a scraper attachment, applicable to any known type of disk harrow having a gang composed of an axle and two bearings and a plurality of disks thereon; and it comprises a spring tensioned reciprocatory beam, extending lengthwise of and operably connected with the gang, and a plurality of scrapers connected with the beam, entered between the disks, and collectively movable into and out of contact with them by the reciprocations of the beam and means for limiting the movement of the beam in one direction and maintaining the scrapers out of contact with the disks.

In carrying out the invention a standard is pivotally connected with one of the bearings and with the scraper beam, and a lever is pivotally connected with the other bearing and with the beam for maintaining it, when stationary and during its reciprocations, in parallel relation with the axis of the disk gangs. The lever projects above the scraper beam and a compressible spring is attached to the beam and provided with a shank attached to the lever above the beam for reversing the movement of the beam and lever. A guide is attached to the beam between the spring and lever through which the shank is entered, and a lock is pivoted to the lever for engaging the guide and limiting the reverse movement of the lever and beam and thereby preventing the scrapers contacting the disks.

For an understanding of the invention reference is to be had to the following description and to the accompanying drawings in which:—

Fig. 1 is an end elevation of a disk gang showing the position of the parts when the scrapers are in contact with the disks;

Fig. 2 is a similar view to Fig. 1 showing the position of the parts when the scrapers are out of contact with the disks;

Fig. 3 is a detail view on a larger scale than Figs. 1 and 2, showing the scraper beam, scrapers and clodbars;

Fig. 4 is a detail view of a scraper; and

Fig. 5 is a detail view of a clodbar.

Like characters of reference refer to like parts throughout the specification and drawings.

The scraper attachment forming the subject matter of this invention is applicable to any of the known types of disk harrow composed of two or more gangs each consisting of an axle 1 and two bearings 2, 2a respectively and a plurality of disks 3 thereon; and it comprises a reciprocatory scraper beam 4 above and extending lengthwise of the gang and a plurality of scrapers 5 suspended from it, entered between the disks and movable into and out of contact with their concave faces.

The scraper beam is shown in the drawings to be supported above the gang by a standard 6 pivotally connected with the bearing 2 and with the scraper beam and by a lever 7 pivotally connected with the bearing 2a and with the beam for maintaining it in parallel relation to the axis of the gang when stationary and during its reciprocations. The lever 7 projects above the beam 4 as shown at 7a and a compressible spring 8 is attached to the beam and provided with a shank 9 attached to the lever above the beam. A guide 10 is attached to the beam between the spring and the lever through which the shank is entered and a lock 11, which in the construction shown in the drawings takes the form of a bar, is pivoted to the projecting end of the lever for engaging the guide and limiting the reverse movement of the lever and scraper beam and thereby preventing the scrapers moving into contact with the disks.

In the construction shown in Fig. 3 each scraper 5 is provided with an arm 12 and the arms are spaced to correspond with the spacing of the disks, and collectively connected to a scraper beam 4 demountably secured to the standard 6 and lever 7 by bolts 14 entered through them. The scrapers 5 are moved into and out of contact with the concave faces of the disks by the reciprocations of the beam and are maintained under tension in contact with the disks by the spring 8.

Clodbars 15 having hooked ends 15a embracing the axle are secured to a clod beam 16 demountably connected to the standard and lever by the bolts 14 which are also entered through the clod beam. When it is not necessary to use the scrapers or clodbars either or both can be demounted from the standard and lever.

When the parts are assembled the scrapers 5, and clodbars 15 are entered between the disks 3, and, secured to the standard and lever by the bolts 14. In their operative position the scrapers 5 are in contact with the concave faces of the disks and the standard 6 and lever 7 are in a substantially vertical position at their limit of movement in the reverse reciprocation of the beam, and the beam and lever are under tension of the spring 8 for maintaining the scrapers in contact with the disks.

During its reciprocations the scraper and clod beams always remain parallel to the axis of the disk gang but move at varying distances controlled by the pivotal connections of the standard and lever with the bearings and the beams. When the scrapers 5 are in contact with the disks 3 the standard 6 and lever 7 are substantially perpendicular and the scraper beam is at its maximum height above the disks. When the scraper beam is reciprocated in the direction indicated by arrow in Fig. 3 the scrapers 5 are moved out of contact with the disks and the scraper beam assumes a position nearer the disks due to the standard and lever moving from a substantially vertical position to an inclined position. When it is desired to maintain the scrapers out of contact with the disks the lock 11 is positioned to engage the guide 10 and prevent the lever 7 moving back again to the vertical position until the lock has been disengaged from the guide.

Having thus fully described my invention what I claim as new and desire to secure by Letters Patent is:—

1. In a disk harrow, a gang having a plurality of disks, and a scraper attachment comprising a spring tensioned reciprocatory scraper beam extending lengthwise of, and operably connected with, the gang, a plurality of scrapers connected with the beam, entered between the disks, and collectively movable into and out of contact with them by its reciprocations, a standard pivotally connected with one of the bearings and with the scraper beam and a lever pivotally connected with the other bearing and the beam for maintaining it when stationary and during its reciprocations in parallel relation with the axis of the gang, said lever projecting above the beam, a compressible spring attached to the beam and provided with a shank attached to the lever above the beam for the reverse movement of the beam and lever and a guide attached to the beam between the spring and lever through which the shank is entered and means for limiting the movement of the beam in one direction and maintaining the scrapers out of contact with the disks.

2. In a disk harrow, a gang, composed of an axle and two bearings and a plurality of disks thereon; and a scraper attachment comprising a spring tensioned reciprocatory scraper beam extending lengthwise of the gang, a standard pivotally connected with one of the bearings and with the scraper beam and a lever pivotally connected with the other bearing and the beam for maintaining it when stationary and during its reciprocations in parallel relation with the axis of the gang, said lever projecting above the beam, a compressible spring attached to the beam and provided with a shank attached to the lever above the beam for the reverse movement of the beam and lever, a guide attached to the beam between the spring and lever through which the shank is entered, a lock pivoted to the lever for engaging the guide and limiting the reverse movement of the beam and lever, and a plurality of scrapers, entered between the disks, connected with the beam said scrapers being collectively movable into and out of contact with the disks by the reciprocations of the beam and maintained out of contact with them when the lock engages the guide and maintained, under tension, in contact with the disks when the lock is disengaged from the guide.

3. A disk harrow as claimed in claim 1 having the scrapers and scraper beam demountably secured to the standard and lever.

4. A disk harrow as claimed in claim 2 having the scrapers and scraper beam demountably secured to the standard and lever.

5. A disk harrow as claimed in claim 1 having the scrapers attached to a scraper beam demountably secured to the standard and lever and a plurality of clodbars entered between the disks connected together by a beam demountably secured to the standard and lever.

Dated at Elora this third day of September, 1930.

LLOYD EDWARD BISSELL.